(No Model.) 2 Sheets—Sheet 1.

J. C. ANDERSON.
CLAY AND CLAY SHALE PULVERIZER OR DISINTEGRATOR.

No. 262,340. Patented Aug. 8, 1882.

Witnesses.
Henry Frankfurter
Lillie E. Anderson

Inventor.
J. C. Anderson

N. PETERS. Photo-Lithographer, Washington, D. C.

(No Model.) 2 Sheets—Sheet 2.
J. C. ANDERSON.
CLAY AND CLAY SHALE PULVERIZER OR DISINTEGRATOR.
No. 262,340. Patented Aug. 8, 1882.
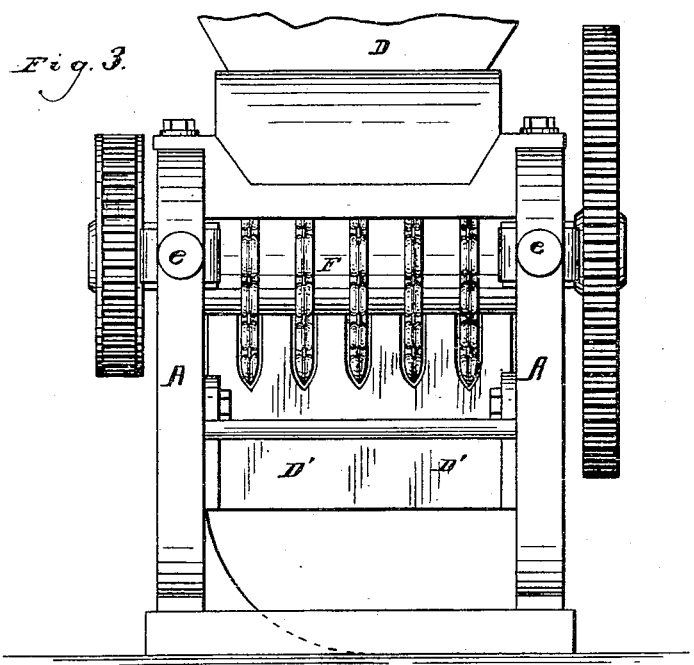
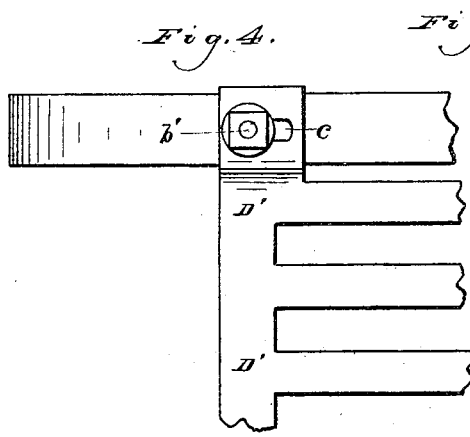
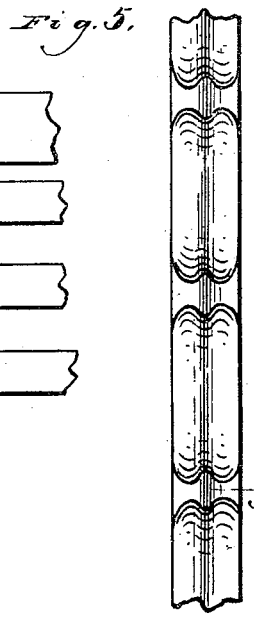
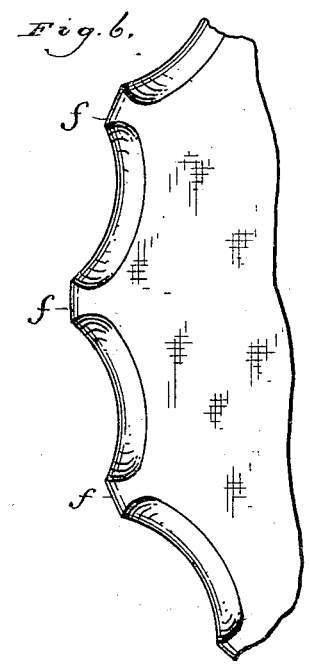
Witnesses.
Henry Frankfurter,
Lillie E. Anderson
Inventor.
J. C. Anderson
N. PETERS. Photo-Lithographer. Washington, D. C.

UNITED STATES PATENT OFFICE.

JAMES C. ANDERSON, OF HIGHLAND PARK, ILLINOIS.

CLAY AND CLAY-SHALE PULVERIZER OR DISINTEGRATOR.

SPECIFICATION forming part of Letters Patent No. 262,340, dated August 8, 1882.

Application filed May 4, 1882. (No model.)

*To all whom it may concern:*

Be it known that I, JAMES C. ANDERSON, a citizen of the United States, residing at Highland Park, in the county of Lake and State of Illinois, have invented certain new and useful Improvements in Clay and Clay-Shale Pulverizers or Disintegrators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to clay and clay-shale pulverizers or disintegrators used in the preparation of said materials for making bricks, tiles, &c.

My invention consists, first, in forming the disintegrating-rolls of a series of toothed disks and providing the teeth and tooth-spaces with chamfered or hatchet-like edges, such teeth being formed for cleaving, abrading, and shedding the clay; second, in providing grid or comb like castings, which castings are formed to encircle the working sides of the rolls, and are provided with alternating bars and spaces in such a manner as to allow the teeth of the abrading-disks, which alternate with each other, to obtrude or project through the spaces and impinge against the ribs of the castings, which are made and set to form an abrading-abutment, and at the same time to scrape or comb the clinging clay from the disks.

Figure 1:
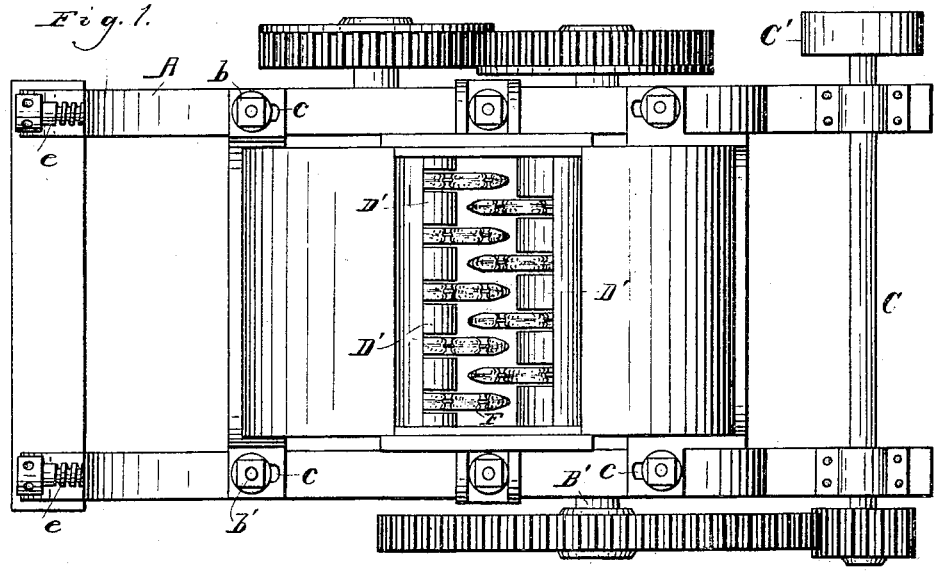
Figure 2:
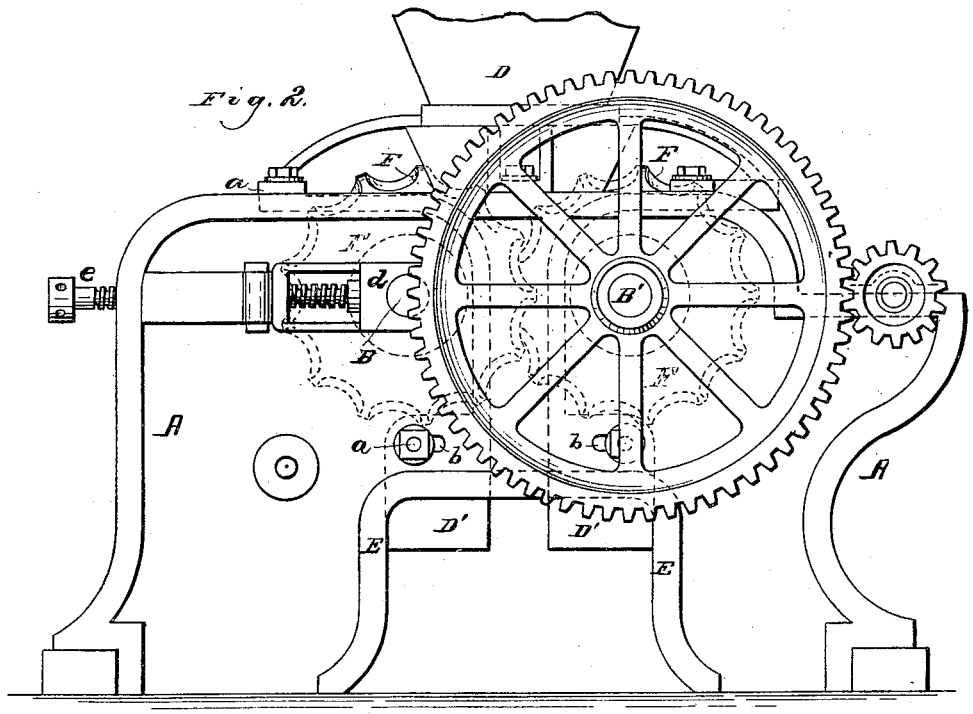

Figure 1 is a top view. Fig. 2 is a side elevation. Fig. 3 is an end view. Fig. 4 is a portion of one of the grids, showing the elongated slot by which the grid is adjusted. Fig. 5 is an edge view of one of the disintegrating or pulverizing disks. Fig. 6 is a side elevation of a portion of the pulverizing or disintegrating disk.

The object of my present invention is to provide a machine which will readily disintegrate clay shale to a suitable size for feeding into a reducer or disintegrator, substantially such a one as covered by my Patent No. 246,992, of September 13, 1881.

A large portion of clay shale comes from the mine or bank in large lumps or slabs, and it is necessary that these lumps be broken or reduced to pieces not exceeding the size of a hen's egg before entering the reducer. This operation is exceedingly difficult for the reason that the clays are unctuous and tend to cling fast and adhere to the teeth of the breaking-rolls, and to become so impacted upon the surface of the rolls as to fill up the tooth-spaces to such a degree that it would be impracticable to feed it through any of the breaking rolls or mechanism of which I have any knowledge without completely clogging the machine. This machine is equally adapted for the reduction of other clays than shale clays for making bricks, tiles, &c.

Referring to the drawings, A designates the general frame-work of the machine, in which are mounted the shafts or axles B B', on which the disintegrating-disks are secured. The shafts or axles are driven by a system of cog-gearing through the shaft C and power-pulley C' from any convenient source of power.

D is a hopper, into which the material to be operated upon is fed. The bottom of said hopper rests upon two sets of grids, to be more fully described hereinafter, said grids forming the lower extension of said hopper.

D' D' are the grids which form the lower contracted extension of the feed-hopper. These grids may be made of a single casting or made up of several pieces or strips of metal bolted together. I prefer, however, to make them in a single piece with slots, into and through which the disintegrating-disks pass. The lower ends of the grids D' D' are secured to brackets or supports E of the main frame by bolts $a$, working in or passing through elongated slots $b$. The upper portion of the grids is secured to the main frame A by means of bolts $b'$ in elongated slots $c$, by which means the grids can be adjusted to a greater or less degree apart to conform with a like adjustment of the rolls, to regulate the degree of fineness of the material reduced.

F F are disks securely mounted on the shafts or axles B B' in any convenient manner, and so arranged as to intermesh and allow the ribs of the grid to form an abutment and abrading-surface, against which the clay or shale is driven by said disks. The grids are so arranged and the disks so mounted that one disk will be opposite a rib of the grid. The disks are provided with serrated or hatchet-shaped peripheries, so as to give the clay or clay shale a cutting and rasping effect, while the ribs of the grid serve to hold the material in contact with the disks, and at the same time clear the disks of the clay, which would otherwise adhere to them and clog the machinery.

One of the axles, B, is made adjustable in its bearings by means of moving boxes $d$ and set-screws $e$, so as to be moved back and forth within prescribed limits, governed by the depth of the teeth on the gear-wheels. If necessary, both axles or shafts B and B' may be made adjustable, which, in connection with the adjustable grids, serves to regulate the mechanism to produce a uniform product, either fine or coarse.

As before stated, the edges of the disintegrating-disks are formed to a hatchet-like edge and serrated to form teeth or projections $f$, which also have an edge so as to cleave the clay and force it to each side of the disks. The clay, being thus shed out of the tooth-spaces, is combed off from the sides of the teeth by the rotation of the disks through the stationary interlacing bars of the grid, and is prevented from adhering to the grid-bars by the peripheral abrasion of the teeth, and is discharged between the grids into a receptacle below, from which it is taken and introduced into the reducer described in my patent heretofore referred to.

Having thus described my invention, what I claim, and desire to secure by Letters Patent, is—

1. In a machine for disintegrating clay shale, clay, and other like material, the double grids D' D', forming the lower portion of the feed-hopper, as set forth.

2. In a machine for disintegrating clay shale, clay, &c., the double grids D' D', made adjustable on the frame and forming the lower portion of the feed-hopper.

3. In a machine for disintegrating clay shale, clay, &c., the combination of the double grids forming a portion of the feed-hopper with the double set of disintegrating-disks, as set forth.

4. In a machine for disintegrating clay shale, clay, &c., the disintegrating-disks secured to the shafts B B', and being provided with serrated hatchet-shaped peripheries, as set forth.

J. C. ANDERSON.

Witnesses:
LILLIAN S. CUSHMAN,
LILLIE E. ANDERSON.